(12) United States Patent
Hibbs et al.

(10) Patent No.: US 7,888,397 B1
(45) Date of Patent: Feb. 15, 2011

(54) POLY(PHENYLENE)-BASED ANION EXCHANGE MEMBRANE

(75) Inventors: Michael Hibbs, Albuquerque, NM (US); Christopher J. Cornelius, Albuquerque, NM (US); Cy H. Fujimoto, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 251 days.

(21) Appl. No.: 12/112,012

(22) Filed: Apr. 30, 2008

(51) Int. Cl.
  *C08J 5/22* (2006.01)
  *C08G 61/02* (2006.01)
  *C08G 61/00* (2006.01)

(52) U.S. Cl. .......................... 521/27; 528/96; 528/397

(58) Field of Classification Search .................. 521/27; 528/86, 397
See application file for complete search history.

(56) References Cited

U.S. PATENT DOCUMENTS

| | | |
|---|---|---|
| 4,690,766 A | 9/1987 | Linder et al. |
| 4,769,148 A | 9/1988 | Fibiger et al. |
| 5,643,968 A | 7/1997 | Andreola et al. |
| 6,780,893 B2 | 8/2004 | Sugaya et al. |
| 7,125,953 B2 | 10/2006 | Lockley et al. |

OTHER PUBLICATIONS

Fujimoto et al. "Ionomeric Poly(phenylene) Prepared by Diels-Alder Polymerization: Synthesis and Physical Properties of a Novel Polyelectrolyte", Macromolecules 2005, 38, 5010-5016.*
Hibbs et al. "Poly(phenylene)-based Anion Exchange Membranes for Alkaline Fuel Cells", Institute for Critical Technologies Virginia Polytechnic Institute and State University, Blacksburg, VA 24061.*
Hibbs, Michael R.; Cornelius, Chris J. Synthesis and characterization of novel anion exchange membranes. Polymer Preprints (American Chemical Society, Division of Polymer Chemistry) (2007), 48(2), 198-199.
Olson, Tim S.; Switzer, Elise E.; Atanassov, Plamen; Hibbs, Michael R.; Cornelius, Christopher J. Alkaline Fuel Cell Employing Novel Anion Exchange Membrane. Abstracts of Papers, 211th ECS National Meeting, Chicago, IL, United States, May 6-10, 2007.

* cited by examiner

*Primary Examiner*—Michael M Bernshteyn
(74) *Attorney, Agent, or Firm*—Elmer A. Klavetter

(57) ABSTRACT

A poly(phenylene) compound of copolymers that can be prepared with either random or multiblock structures where a first polymer has a repeat unit with a structure of four sequentially connected phenyl rings with a total of 2 pendant phenyl groups and 4 pendant tolyl groups and the second polymer has a repeat unit with a structure of four sequentially connected phenyl rings with a total of 6 pendant phenyl groups. The second polymer has chemical groups attached to some of the pendant phenyl groups selected from $CH_3$, $CH_2Br$, and $CH_2N(CH_3)_3Br$ groups. When at least one group is $CH_2N(CH_3)_3Br$, the material functions as an anion exchange membrane.

4 Claims, 4 Drawing Sheets

POLY(PHENYLENE)-BASED ANION EXCHANGE MEMBRANE

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

BACKGROUND OF THE INVENTION

The present invention relates to anion exchange membranes and, more particularly, to anion exchange membranes based on a poly(phenylene) backbone prepared by a Diels-Alder polymerization reaction.

Anion exchange membranes (AEMs) have been used mainly in electrodialysis for the desalination of brackish water and for the production of table salt from sea water. Interest has grown in more demanding applications such as alkaline fuel cells and electrolysis. Hydrogen fueled alkaline fuel cells consisting of a liquid electrolyte (KOH) have demonstrated the ability to generate high power densities. The main advantage of the alkaline media as compared to other low temperature fuel cells is that the kinetics at the cathode oxygen reduction reaction and anode process are much more facile. In addition many non-noble metals and their corresponding oxides are stable in alkaline media. For these reasons platinum based catalysts are not needed and non-noble metal catalysts can be employed. Other technical issues have prevented the alkaline liquid electrolyte fuel cell from being a viable commercial power generator. Many of these issues are associated with the liquid electrolyte. For example, ultra pure oxidants must be used to prevent electrode degradation caused by the formation of carbonate species. Liquid electrolyte cells (and particularly the circulated electrolyte ones) were shown to be complex in design and operation. Over the last decade attempts have been made to develop alkaline anion-exchange membranes and eliminate the issues related to the liquid electrolyte. The main concern with alkaline anion-exchange membranes is the long term stability. Under operation at elevated temperatures membrane degradation occurs by beta-hydrogens undergoing the Hoffmann elimination reaction.

Useful would be a robust alkaline anion exchange membrane immune to such degradation. Unlike cation-exchange membranes where highly durable perfluorinated membranes dominate the market, commercially-available AEMs are typically based on crosslinked polystyrene and are not very stable in alkaline environments. In addition, they are generally blended with other inert polymers and fabric supports that limit their ionic conductivities. Thus there is a need to develop new AEMs that not only have high conductivities and ion selectivities, but that also exhibit excellent chemical stability at high pH values and elevated temperatures.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
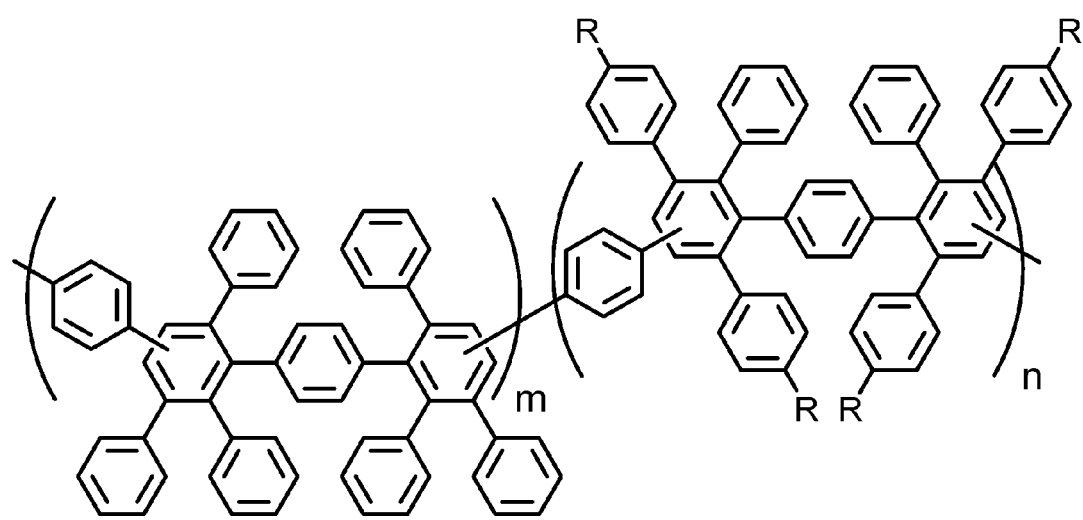
FIG. 1 shows a structural representation of the parent poly (phenylene) used to make the anion exchange membranes.

The present invention is an anion exchange membrane based on the parent poly(phenylene) as depicted in FIG. 1. The ratio of m to n in FIG. 1 can be varied from zero to nine and the copolymers can be prepared with either random or multiblock structures. When m:n is zero, the resulting poly (phenylene) is a homopolymer in which the repeat unit has a structure comprised of four sequentially connected phenyl rings with a total of 2 pendant phenyl groups and 4 pendant tolyl groups. When m:n is not zero, the resulting poly(phenylene) is a copolymer in which one of the repeat units has the structure previously described and the other repeat unit has a structure comprised of four sequentially connected phenyl rings with a total of 6 pendant phenyl groups. Each R group can be a group selected from $R=CH_3$, $CH_2Br$, and $CH_2N(CH_3)_3Br$. When at least one R group is $CH_2N(CH_3)_3Br$, the material functions as an anion exchange membrane. The pendant aryl rings are bulky and prevent the chains from packing closely together in the solid state. These factors result in space between the polymer chains which can hold water molecules when the membranes made from these polymers becomes hydrated. The greater water uptakes lead to the higher ionic conductivities.

Figure 2:
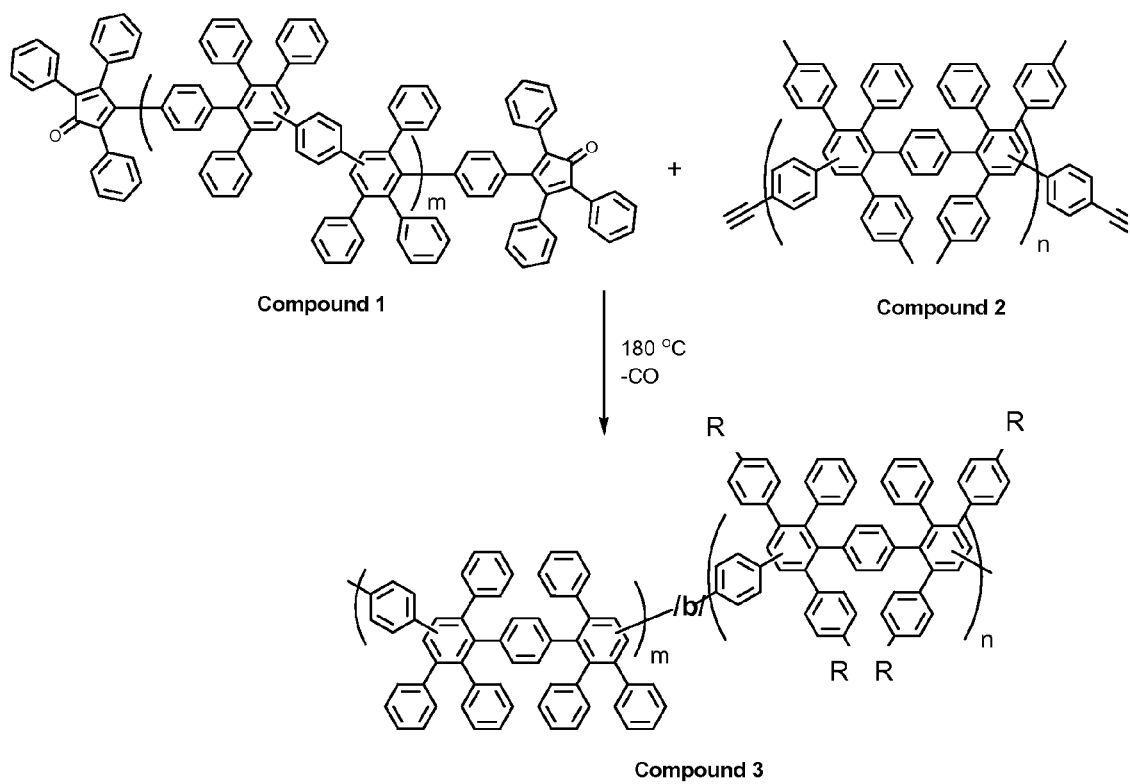
FIG. 2 shows the reaction of two oligomers to form the multiblock copolymer of the present invention.

As shown in FIG. 2, the multiblock copolymer of the present invention is synthesized from two oligomers, one oligomer, referred to as Compound 1, having cyclopentadienone end groups and the other oligomer, referred to as Compound 2, having ethynyl end groups. The Compound 1 oligomer has a repeat unit a structure comprised of four sequentially connected phenyl rings with a total of 6 pendant phenyl groups and it has cyclopentadienone end groups. The Compound 1 oligomer has an average number of m repeat units where $20 \geq m \geq 7$. The Compound 2 oligomer has a repeat unit a structure comprised of four sequentially connected phenyl rings with a total of 2 pendant phenyl groups and 4 pendant tolyl groups and it has ethynyl end groups. The Compound 2 oligomer can have an average number of n repeat units where $18 \geq n \geq 6$. These two oligomers are combined at elevated temperature to produce the Compound 3 block copolymer shown in FIG. 2 where /b/ designates the junction of two different blocks rather than two random repeat units.

Figure 3:
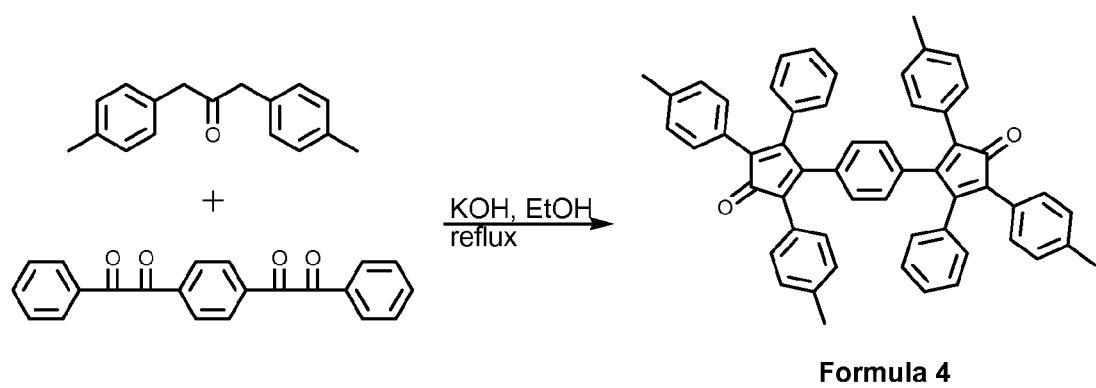
FIG. 3 shows the reaction to form a precursor bis(cyclopentadienone) compound 4.
Figure 4:
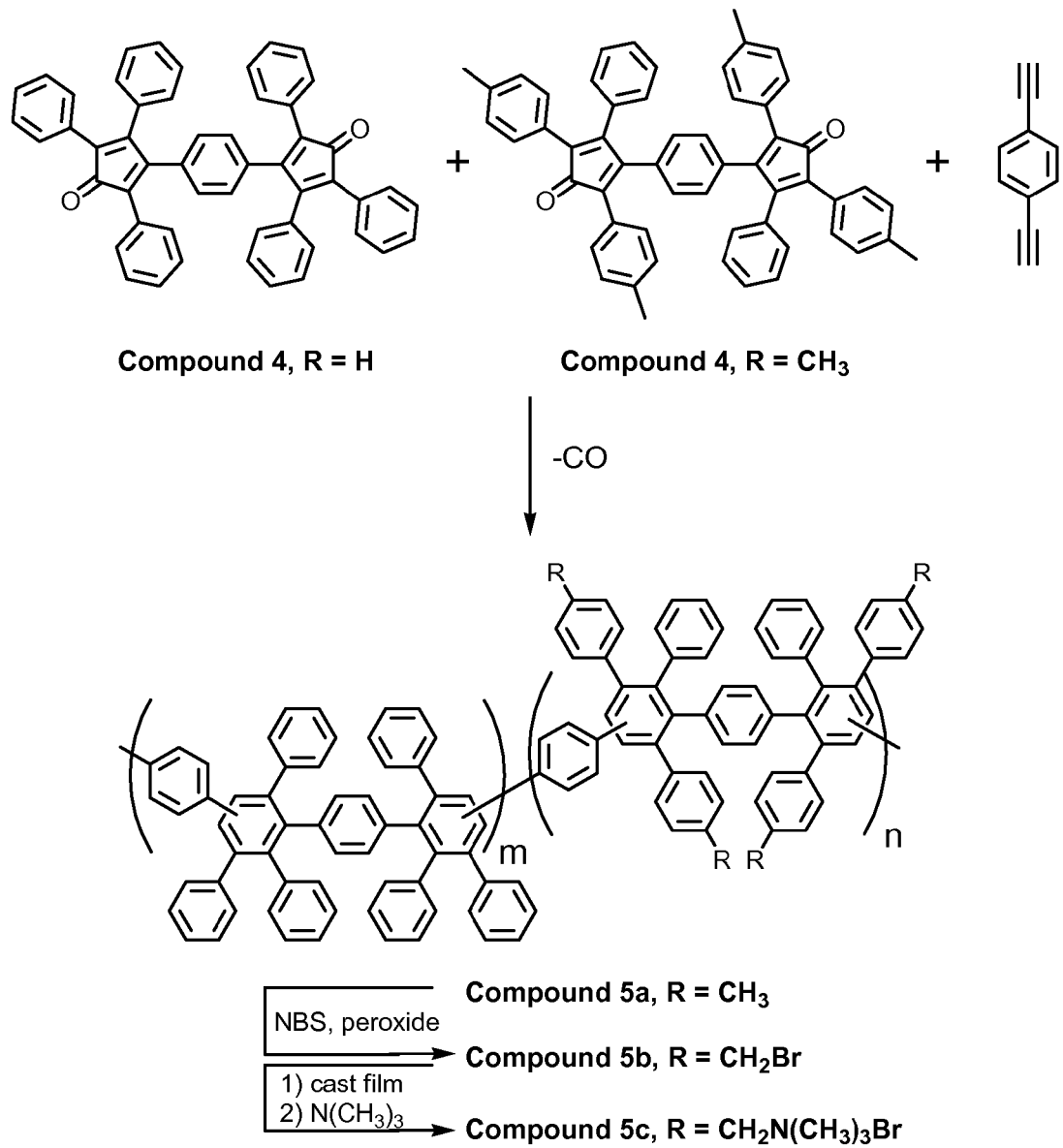
FIG. 4 shows the reaction to form the parent poly(phenylene) compound 5a and subsequent reactions to form quaternary ammonium groups attached to the polymer.

The synthesis of the parent poly(phenylenes) of the present invention can be initiated from a variety of precursor compounds. In the general synthesis, the first step is to prepare via a known synthetic method a bis(cyclopentadienone) Compound 4 by a condensation reaction of a dibenzylketone with a bisbenzil compound (see FIG. 3) as a preparation for making a monomer for the parent poly(phenylene). In this preparation, every $R_1$ designated on the dibenzylketone and Compound 4 structures can be either a hydrogen atom or a methyl ($CH_3$) group. The poly(phenylene) Compound 5a is generally synthesized via a Diels-Alder reaction as shown in FIG. 4. In one embodiment $R_1=CH_3$. In another embodiment $R_1=H$. In another embodiment, random copolymers have been produced using a mixture of monomers where $R_1=H$ on some of the bis(cyclopentadienone)s and $R_1=CH_3$ on the remaining bis(cyclopentadienone)s. The Diels-Alder polymerization to form Compound 5a was conducted by heating equimolar amounts of Compound 4 and 1,4-diethynylbenzene in diphenyl ether with the loss of one carbon monoxide molecule for each Diels-Alder reaction. It is this loss of CO and the accompanying formation of a highly stable aromatic ring that makes the polymerization irreversible. The product, a Diels-Alder poly(phenylene), is a tough, off-white thermoplastic. All prepared samples could be cast into clear, creasible films.

Molecular weights for several batches of the methylated homopolymer (Compound 5a where m=0) are given in TABLE 1, with $M_n$ and $M_w$ being the designations for the number average and weight average molecular weights, respectively, and PD being the polydispersity value (i.e., $M_w/M_n$). All samples were cast into clear, creasible films.

TABLE 1

| Homopolymer batch number | $M_n *10^3$ (g mol$^{-1}$) | $M_w *10^3$ (g mol$^{-1}$) | PD |
|---|---|---|---|
| 1 | 31 | 69 | 2.2 |
| 2 | 28 | 62 | 2.2 |
| 3 | 31 | 71 | 2.3 |
| 4 | 32 | 65 | 2.0 |

The parent poly(phenylene) Compound 5a can be brominated to give Compound 5b by the addition of a source of bromine, such as N-bromosuccinimide (NBS), in the presence of an initiator, such as benzoyl peroxide; this bromination of the methyl groups can only occur when R is a methyl group. Solutions of the brominated polymer 5b can then be cast into films (membranes) by filtering the solutions into flat dishes that are then placed into a vacuum oven and heated for a period of time, after which the resulting films are removed by immersing them in water. The films are then immersed in a solution of aqueous trimethylamine to convert some or all of the bromomethyl groups into benzyl trimethylammonium groups to give a compound referred to as an animated poly (phenylene) compound, designated as compound 6 (see FIG. 5). Not all of the brominated methyl groups are converted into ammonium salts. The reaction to convert bromomethyl groups in compound 5b to benzyltrimethyl ammonium groups could only be carried out to 65-75% completion. So, the compound 6 films (membranes) each contain some unreacted bromomethyl groups. TABLE 2 lists the degree of functionalization for several batches of the homopolymer batches after bromination as well as the characterization data for the resulting anionic exchange membranes, including the ion exchange capacity (IEC) values.

TABLE 2

| Homopolymer Batch Number | DF[a] | Theoretical IEC (meq/g) | Measured IEC (meq/g)[b] | Water Uptake (%) |
|---|---|---|---|---|
| 1 | 1.40 | 1.48 | 0.96 | 64 |
| 2 | 1.84 | 1.86 | 1.39 | 75 |
| 3 | 2.08 | 2.06 | 1.39 | 82 |
| 4 | 2.44 | 2.33 | 1.49 | 91 |

[a]Degree of functionalization = (number of bromomethyl groups/repeat unit);
[b]Calculated from DF assuming complete amination, ion exchange, and water removal upon drying.

Parent poly(phenylene)s having multiblock structures (Compound 3) were prepared in two steps: synthesis of the oligomeric blocks (Compound 1 and Compound 2) and subsequent coupling of the blocks. The Compound 1 oligomeric block was prepared by the same procedure used for making the compound 5a polymer except that an excess of the non-methylated bis(cyclopentadienone) (Compound 4 where R=H) was charged with 1,4-diethynyl benzene to target specific block sizes. The Compound 2 oligomeric block was prepared by the same procedure used for making the compound 5a polymer except that an excess of 1,4-diethynyl benzene was charged with methylated bis(cyclopentadi-enone) (Compound 4 where R=CH$_3$) to target specific block sizes. The coupling of the two blocks is shown in FIG. 2. Cyclopentadienones have a purple color that goes away upon reaction with an ethynyl group. This color change can often be used to monitor the progress of the polymerization reactions. Thus a solution of the Compound 1 oligomer with cyclopentadienone endgroups has a dark purple color when it is blended with the yellow/orange solution of the Compound 2 oligomer with ethynyl endgroups. The resulting mixture is dark but becomes orange as the reaction progresses. An increase in the viscosity of the reaction mixture is also visible as the coupling takes place.

The irreversible nature of the Diels Alder reaction shown in FIG. 2 and FIG. 4 to synthesize the poly(phenylene) backbone ensures that the repeat units within Compound 1 and Compound 2 will not undergo a randomization during the coupling reaction. The Compound 3 multiblock copolymer product is a tough, off-white thermoplastic. Molecular weights for Compound 3 multiblock copolymers for various Compound 1/Compound 2 block size ratios is given in TABLE 3, with $M_n$ and $M_w$ being the designations for the number average and weight average molecular weights, respectively, and PD being the polydispersity value (i.e., $M_w/M_n$). All samples were cast into clear, creasible films.

TABLE 3

| Compound 1: Compound 2 block sizes $10^3$ (g mol$^{-1}$) | $M_n *10^3$ (g mol$^{-1}$) | $M_w *10^3$ (g mol$^{-1}$) | PD |
|---|---|---|---|
| random | 41 | 86 | 2.1 |
| 5:5 | 39 | 116 | 3.0 |
| 10:10 | 39 | 88 | 2.3 |
| 15:15 | 32 | 72 | 2.3 |

The multiblock copolymers (Compound 3) were brominated using the same radical bromination reaction that was used to brominates the homopolymer and the random copolymers (Compound 5a). The number of bromomethyl groups formed per repeat unit or degree of functionalization (DF) was controlled by varying the amount of brominating reagent that was used and it was measured by $^1$H NMR. The brominated copolymers were cast as films which were then soaked in aqueous trimethyl amine to convert the bromomethyl groups into benzyltrimethyl ammonium groups, yielding anionic exchange membranes. TABLE 4 lists the degree of functionalization for the multiblock copolymer batches after bromination as well as the characterization data for the resulting anionic exchange membranes, including the ion exchange capacity (IEC) values, for several different Compound 1 and Compound 2 block sizes. Although the ratio of the block sizes shown in TABLE 4 is 1:1, the ratio can be varied. For all of the samples tested, the measured IEC values ranged from 0.9 to 1.5 meq/g.

TABLE 4

| Compound 1: Compound 2 block sizes $10^3$ (g mol$^{-1}$) | DF[a] | Theoretical IEC (meq/g) | Measured IEC (meq/g)[b] | Water Uptake (%) |
|---|---|---|---|---|
| random | 1.56 | 1.57 | 1.15 | 78 |
| 5:5 | 1.48 | 1.50 | 1.14 | 84 |
| 10:10 | 1.38 | 1.41 | 1.14 | 76 |
| 15:15 | 1.54 | 1.58 | 1.26 | 77 |

[a]Degree of functionalization = (number of bromomethyl groups/repeat unit);
[b]Calculated from DF assuming complete amination, ion exchange, and water removal upon drying.

EXAMPLES

Example 1

Synthesis of tetramethyl bis(cyclopentadienone) (Compound 4)

In the synthesis of Compound 4, a mixture of dimethyldibenzyl ketone (42.16 g, 176.9 mmol) and 4-phenylglyoxalylbenzil (29.98 g, 87.57 mmol) in ethanol (750 mL) was stirred and heated until a solution formed. A solution of KOH (4.91 g, 87.6 mmol) in water (10 mL) was carefully added and the solution was heated at reflux for 1 h. The solution was then cooled to room temperature and stirred for 18 h. The resulting mixture was filtered and the filtrate was triturated with water and then with ethanol after which it was collected by filtration and dried under vacuum at 120° C. to yield Compound 4 as a dark purple solid (37.13 g, 57%).

Example 2

Synthesis of Compound 5a

In the synthesis of Compound 5a, a cyclopentadienone (Compound 4 where R=$CH_3$) (14.84 g, 19.87 mmol), 1,4-diethynylbenzene (2.51 g, 19.87 mmol), and diphenyl ether (70 mL) were charged to a flask under argon. The mixture was frozen in a dry ice/acetone bath and was freeze-thaw degassed (2 times) before heating at 180° C. for 21 h. The reaction was cooled to 100° C. and toluene (70 mL) was added to thin the solution before cooling to room temperature. The solution was poured into excess acetone and the precipitate was dried, dissolved in toluene (50 mL), and reprecipitated into acetone. The resulting solid was dried under vacuum at 250° C. to yield a tan solid (13.84 g, 85%).

Example 3

Synthesis of the Compound 1 Oligomer, the Compound 2 Oligomer and the Resulting Compound 3 Multiblock Copolymer Multiblock copolymers can be and were prepared with varying block sizes. The procedure for preparing the Compound 3 multiblock copolymer in which the average block size for each component was about 5000 g/mol is described in this embodiment. In the synthesis of the Compound 2 oligomer, methylated bis(cyclopentadienone) (Compound 4 where R=$CH_3$)) (1.5097 g, 2.0212 mmol), 1,4-diethynylbenzene (0.2975 g, 2.3583 mmol), and diphenyl ether (7 mL) were charged to a flask under argon. The mixture was frozen in a dry ice/acetone bath and was freeze-thaw degassed (2 times) before heating at 170° C. for 18 h and then cooled to 150° C. Simultaneously in a separate flask, in the synthesis of the Compound 1 oligomer, nonmethylated bis(cyclopentadienone) (Compound 4 where R=H) (1.3962 g, 2.0210 mmol), 1,4-diethynylbenzene (0.2125 g, 1.6845 mmol), and diphenyl ether (7 mL) were charged under argon. The mixture was frozen in a dry ice/acetone bath and was freeze-thaw degassed (2 times) before heating at 170° C. for 18 h and then cooled to 150° C. The two solutions were then combined using diphenyl ether (7 mL) to complete the transfer and the resulting solution was heated at 160° C. for 19 h. The reaction was cooled to 100° C. and toluene (15 mL) was added to thin the solution before cooling to room temperature. The solution was poured into excess acetone and the precipitate was dried, dissolved in toluene (30 mL), and reprecipitated into acetone. The resulting solid, the Compound 3 multiblock copolymer, was dried under vacuum at 250° C. to yield a tan solid (2.89 g, 91%).

Example 4

Bromination of the parent poly(phenylene)s

The methylated homopolymer (Compound 5a where m=0) (13.27 g) was dissolved in 1,1,2,2-tetrachloroethane (215 mL) in a flask equipped with a magnetic stir bar and a condenser. The solution was heated to 85° C. and N-bromosuccinimide (6.50 g, 36.5 mmol) and benzoyl peroxide (443 mg, 1.83 mmol) were added. After 3 h, the reaction was cooled and poured into excess ethanol. The precipitate was washed with water and ethanol twice and then dried under vacuum at room temperature to yield a tan solid (Compound 5b) (15.26 g).

Example 5

Casting and Amination of Films

Solutions of the brominated poly(phenylenes) (Compound 5b) in chloroform (5-8% w/w) were filtered into glass dishes, covered with an inverted beaker and allowed to sit at room temperature for approximately 24 h. The films were removed from the dishes by immersing them in water. To form the benzyltrimethylammonium functional groups, the films were immersed in a 45% w/w/ solution of trimethylamine in water in a closed container for 48 h at room temperature. They were then soaked in 1 M NaOH for 48H to exchange the chloride ions for hydroxide ions. Finally, the membranes were immersed in deionized water for at least 24 h prior to analysis.

Although the invention has been described in detail with particular reference to these preferred embodiments, other embodiments can achieve the same results. Variations and modifications of the present invention will be obvious to those skilled in the art and it is intended to cover the appended claims of all such modifications and equivalents. The entire disclosures of all references, applications, patents and publications cited above are hereby incorporated by reference.

We claim:
1. A poly(phenylene) material, comprising:
a poly(phenylene) compound represented by the structure

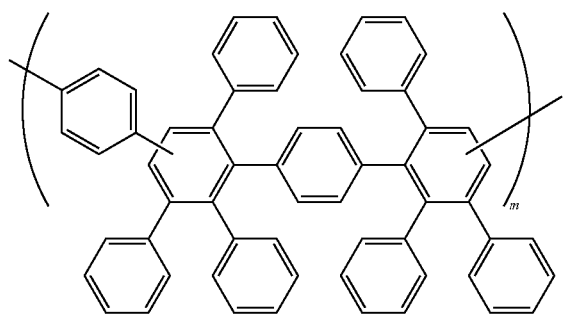

-continued

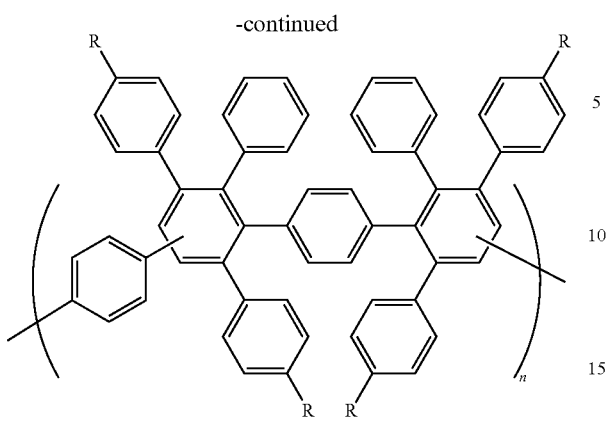

consisting essentially of a first polymer with m repeating units with $7 \leq m \leq 20$ and a second polymer with n repeating units with $6 \leq n \leq 18$, said first polymer having a structure with 4 phenyl rings having 6 pendant phenyl groups and said second polymer having a structure with 4 phenyl rings having 2 pendant phenyl groups and 4 pendant tolyl groups, and each R group can be a group selected from $R=CH_3$, $CH_2Br$, and $CH_2N(CH_3)_3Br$.

2. The poly(phenylene) material of claim 1 where at least one R group is $CH_2N(CH_3)_3Br$ and the material functions as an anionic exchange membrane.

3. The poly(phenylene) material of claim 2 wherein the material has an ion exchange capacity between 0.9 and 1.5 meq/g.

4. The poly(phenylene) material of claim 1 wherein m=n.

* * * * *